(12) United States Patent
Buch et al.

(10) Patent No.: US 6,185,059 B1
(45) Date of Patent: Feb. 6, 2001

(54) METHOD OF CONTROLLING A DISK DRIVE FOR ELIMINATING BLANKING INTERVALS FORMED ON A STORAGE DISK POSITIONED WITHIN THE DRIVE

(75) Inventors: Bruce Buch, Westboro, MA (US); John VanLaanen, Louisville, CO (US)

(73) Assignee: Quantum Corp., Milpitas, CA (US)

( * ) Notice: Under 35 U.S.C. 154(b), the term of this patent shall be extended for 0 days.

(21) Appl. No.: 09/219,685

(22) Filed: Dec. 23, 1998

(51) Int. Cl.[7] .............................. G11B 5/09; G11B 5/596
(52) U.S. Cl. .................. 360/51; 360/77.04; 360/77.08
(58) Field of Search ................................ 360/51, 62, 48, 360/77.08, 77.04

(56) References Cited

U.S. PATENT DOCUMENTS 5,036,408  7/1991  Leis et al ............................ 360/48

Primary Examiner—W. Chris Kim
Assistant Examiner—Regina Y. Neal

(57) ABSTRACT

A method of controlling a disk drive that reduces the space on the data storage surface of a storage disk otherwise effectively required to be taken up by embedded servo sectors. In disk drives employing wide-writer, narrow-reader, dual element heads, each servo burst field ends with a burst correction value (BCV) field. This BCV field enables the wide-writer head to be accurately positioned within track boundaries before writing begins to the data sector following a servo sector. The present invention takes advantage of the fact that burst correction values are only required by the head incident to data writing operations. Since a finite settle time is required to switch the read channel from servo mode to user data mode, and since the BCV field is not needed for reading operations, mode switching and channel settling can begin while the head is still passing over the BCV field. Sooner switch over from servo mode to user data read mode means that the blanking interval, and concomitant disk space, heretobefore required by the prior art approach, is completely avoided by the new disk drive control method.

11 Claims, 5 Drawing Sheets

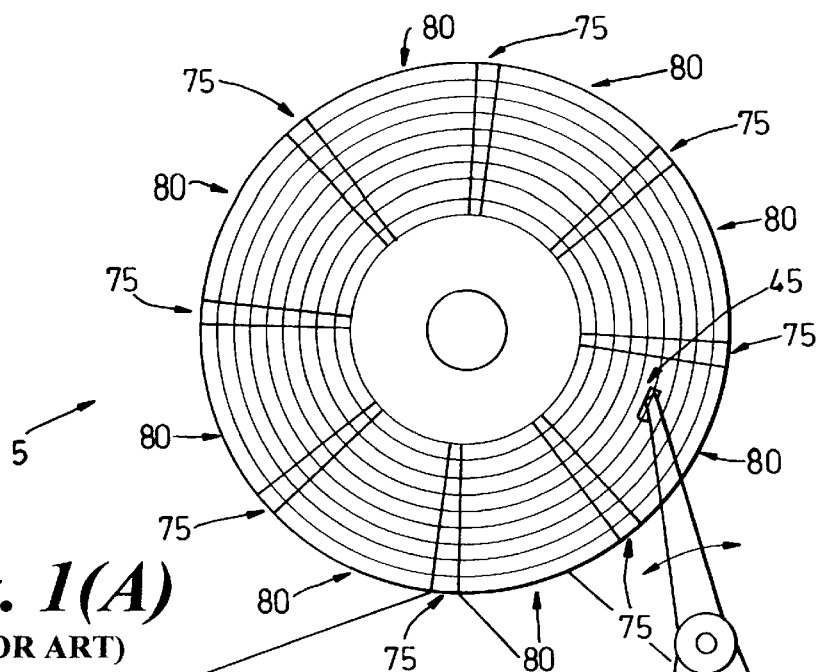
Fig. 1(A)
(PRIOR ART)
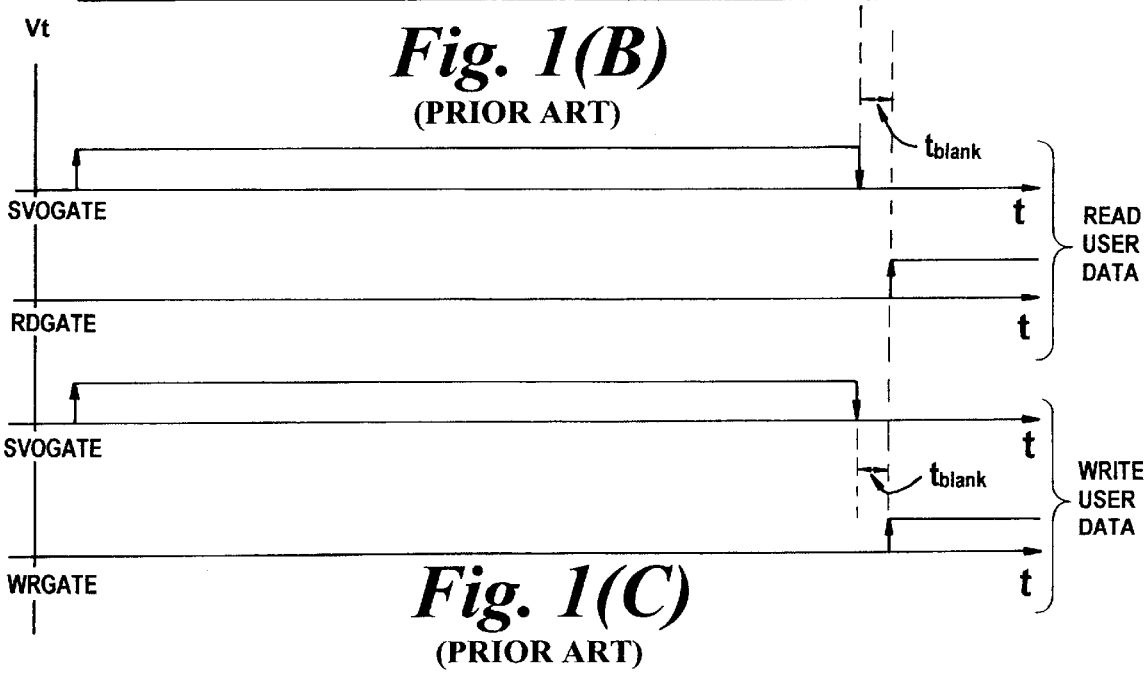
Fig. 1(B)
(PRIOR ART)
Fig. 1(C)
(PRIOR ART)

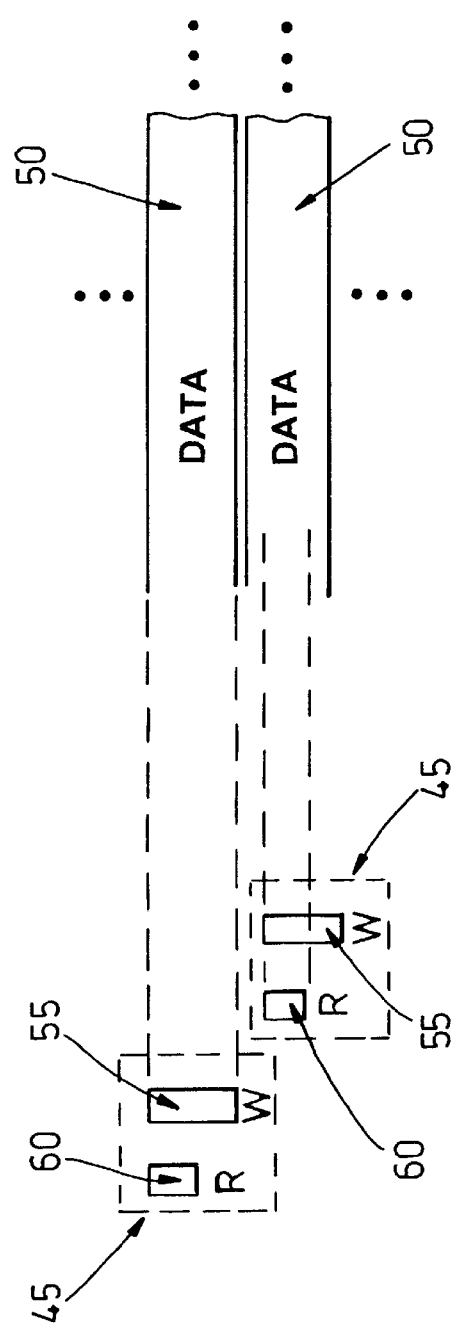

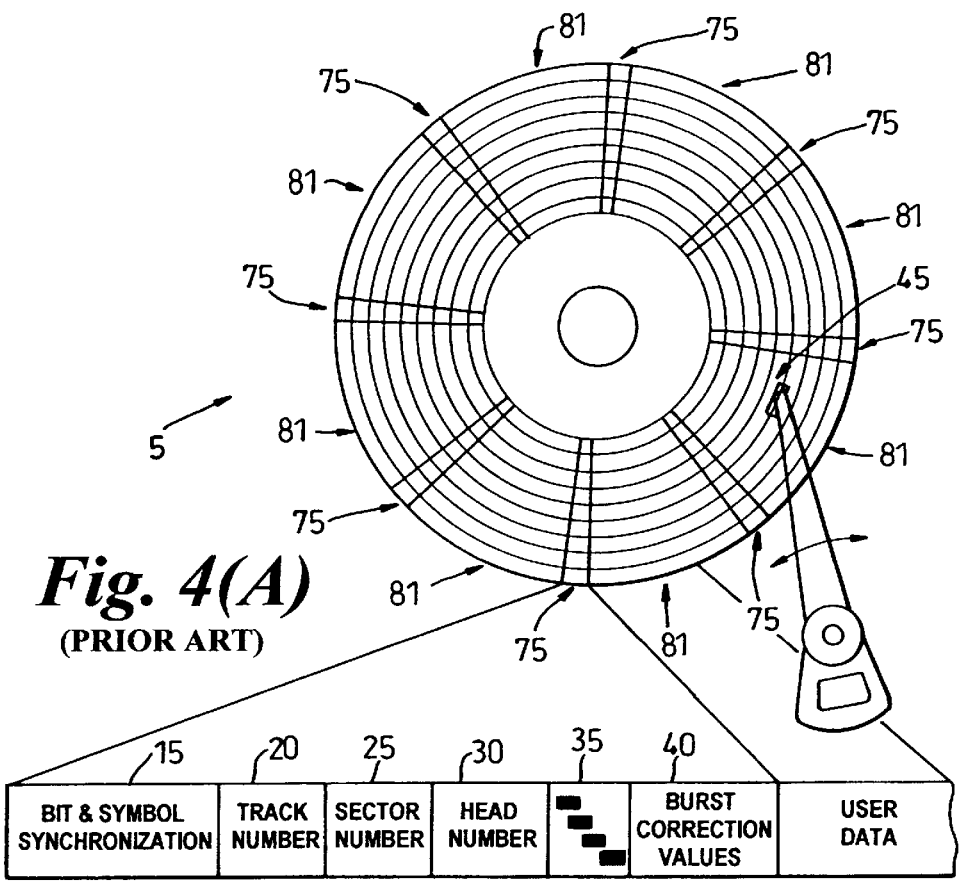
Fig. 4(A)
(PRIOR ART)
Fig. 4(B)
(PRIOR ART)
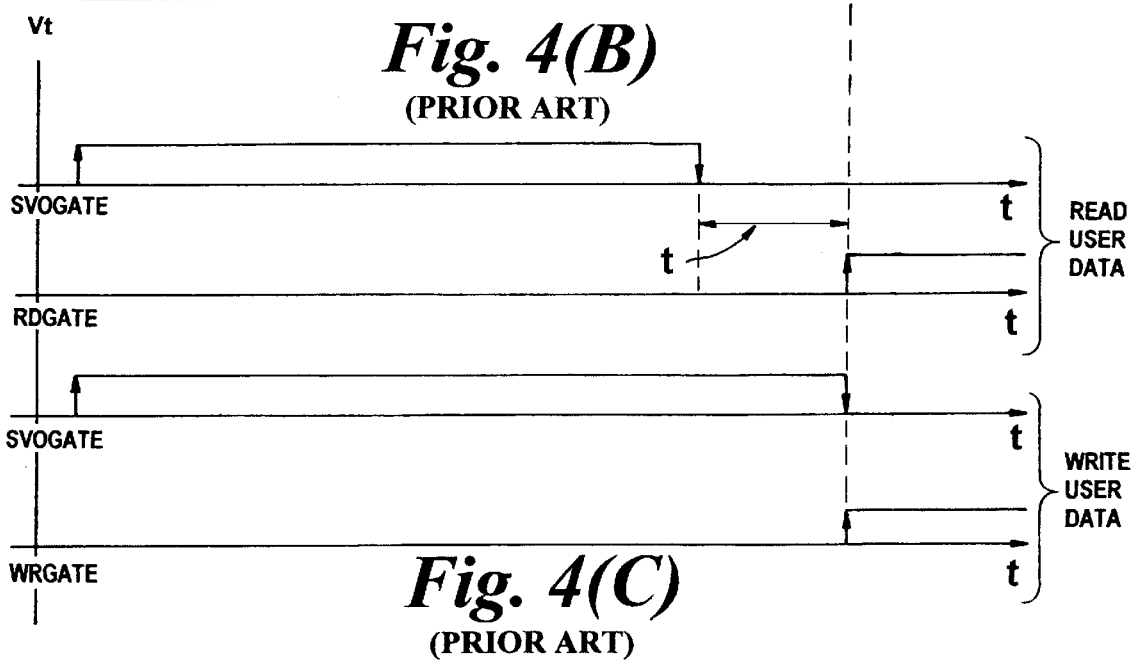
Fig. 4(C)
(PRIOR ART)

METHOD OF CONTROLLING A DISK DRIVE FOR ELIMINATING BLANKING INTERVALS FORMED ON A STORAGE DISK POSITIONED WITHIN THE DRIVE

FIELD OF THE INVENTION

The invention relates generally to formatting information on a storage disk employed within a disk drive subsystem and more precisely to a method of formatting the information on a storage disk such that the number of blanking intervals formed on the storage disk are eliminated for increasing the information storage capacity of the storage disk.

BACKGROUND OF THE INVENTION

Referring to FIG. 1(A) in disk-type magnetic recording systems for digital applications, magnetic transducer elements, or heads, are used to record information onto (i.e., write) or retrieve information from (i.e., read) the disk surface or surfaces. Each storage disk comprises an annular substrate onto which is deposited a magnetic recording medium. Each disk surface is divided into thousands of concentric, annular bands, or "tracks" each having a predetermined unique radial location. Each head is supported in close proximity to an associated disk surface by a head positioning assembly, or actuator, that supports the head near the disk surface and moves it from one radial position to another, thereby permitting use of a single head for reading and writing along multiple concentric tracks. The positioner assembly for each head or group of heads includes an actuator arm and an actuator motor. The actuator motor moves the actuator arm, to change the position of the head with relation to the tracks on the disk. A disk drive may include a plurality of stacked disks, and one actuator motor may be used to move a corresponding number of actuator arms and heads in unison.

In particular, the concentric tracks include a plurality of equally spaced "servo" sectors 75 radially extending from the inner diameter to the outer diameter of the disk surface. Data sectors 80, which are used to store user data, are defined between each of the servo sectors 75 such that the servo sectors 75 can provide position information to the disk drive controller to enable precise head positioning for reading and writing information in the data sectors 80. The linearized length of each data track is different by virtue of each track having a different radius from a central point of rotation. Thus, tracks defined at the inner diameter region of the disk have a shorter linearized length than tracks defined at the outer diameter region of the disk. Additionally, these differences in linearized track lengths cause the angular velocity of the disk-head, with respect to the disk, to be lower at inner diameter tracks than at outer diameter track because the disk(s) rotate at a constant angular velocity. The differences in linearized track lengths from one track to another and differences in disk-head velocity as the head is moved from one position on the disk to another cause data transfer rates to vary from one track to another. For example, when the disk head is positioned at an inner diameter track of the disk, the data transfer rate will be lower than when the disk head is positioned at an outer diameter track of the disk. While the disk head is track seeking i.e., moving from one radial position to another, the disk head must be able to read servo position information prerecorded in the servo sectors 75 regardless of track radius or position. Therefore, servo position information is typically prerecorded in the servo sectors 75 using a constant bit frequency pegged at the lowest data rate (inner track data rate). As a result, when the disk head is in track seeking mode, the head can read position information at any radial extent from the central rotation axis for positioning the head at a destination data track. In order to maintain a nearly optimal spatial bit density in all of the data tracks defined within data sectors 80, the data tracks are read and written at different frequencies optimized to track radius, i.e., user-data frequency.

Another mode of operation is track following. Track following occurs after the disk head is positioned at the destination track. In this mode, servo position information is read in order to maintain the disk head precisely on a data track center line during reading or writing operations.

Referring to FIG. 1(B), the servo information prerecorded in the servo fields of each of the servo sectors 75 includes: data bit and data symbol synchronization field 15; data track number field 20; data sector number field 25, head number field 30; servo bursts field 35; and burst correction values field 40. The data bit and symbol synchronization field 15 provides frequency, phase and framing information for the servo information recorded in the servo field so that subsequent fields can be synchronously read. The track 20, sector 25, and head number 30 fields are digitally represented numbers indicating the track number, angular position (sector), and the head/surface where the servo field is located on the disk. The servo bursts field 35 are typically a number of sub-fields recorded at controlled radial offsets from track center. The relative difference in amplitude detected in reading these servo bursts yields fine position information for positioning the disk-head at track center. The burst correction field 40 is a digitally recorded field used to correct systematic offsets written into the servo burst field 35. These systematic offsets typically originate as a result of tolerance errors in servo writers which are used to initially record the servo data onto the disk.

Referring to FIG. 2(A), the write element 55 of the read/write head 45, must be precisely positioned on a predefined data track before writing userdata to the storage disk can commence. This precise positioning of the write element is required because there is minimal guard band or space between each adjacent data track in order to maximize the number of data tracks defined on the disk. Since, the physical dimensions of the write element 55 defines the width of the data track 50, any deviation from the predefined data track 50 by the write element 55 can cause the data stored on adjacent data tracks 50 to be overwritten or erased. In order to precisely position the write element on a data track, the servo burst field 35 is relied on for write element positioning on the track center line. Additionally, the burst correction values 40, described above, provide further correction to accommodate any defects written into the servo data by servo writers. As a result, the burst correction values provide fine positioning of the write element 55 on a predefined data track 50 prior to commencement of writing user-data on to the data track 50.

Referring to FIG. 2(B), when the disk controller 10 is in the read userdata mode, the read element 60 of the read/write head 45 is positioned at the approximate center of the predefined data track 50. Since the physical width of the read element 60 incorporated with read/write head 45 is substantially smaller than the width of the write element 55, the read element 60 does not require as precise positioning as is required for writing. Furthermore, in the event that data is read from an adjacent data track 50, an error condition is realized whereupon the read element 60 can be re-positioned and the data track 50 can be read a second time without loss of data. The approximate positioning of the read element 60 onto a predefined data track 50 can be accurately accomplished with the high frequency servo burst field 35. Therefore, the burst correction values field 40 is not required when the disk controller 10 is in the read user-data mode.

Referring to FIG. 3, read channel electronics typically includes two read channel paths, whereby one path is tuned for reading at the servo recording frequency and the other is tuned for reading at the user-data recording frequency. Since the servo and data sectors are interleaved, the disk read channel electronics must be able to quickly switch back and forth between reading at the servo frequency and reading at the data frequency. The act of switching between the read channel paths for either reading at the servo frequency or reading at the data frequency introduces voltage transients to the read channel electronics. These transients can render the channel unable to read either the servo or data frequencies until the transients have had time to settle. As shown in FIG. 1(C), this settle time causes blanking intervals on the disk, $t_{blank}$, during which the read channel electronics is rendered unable to retrieve information from the disk. These blanking intervals are approximately 500 nano-seconds in duration. Each time the read channel electronics switches between reading at the servo frequency and reading at the data frequency a small blanking interval is formed on the disk. This blanking interval area is not used for information storage because the information cannot be retrieved due to read channel settling. Since the read channel switches between reading at the servo and data frequencies a plurality of times during a data block reading operation, a plurality of these blanking intervals are formed.

In switching the read channel from reading at the servo frequency to writing at the data frequency a blanking interval is not formed on the storage disk because the write channel includes a different data path than the read channel as shown in FIG. 3. Accordingly, the write channel can commence writing data immediately after switching from reading at the servo frequency. Thus, the write channel does not form a blanking interval on the disk for the purpose of channel settling when switching from reading at the servo frequency to writing at the data frequency. Nevertheless, a plurality of these blanking intervals are formed on the disk when switching back and forth between reading at the servo frequency and reading at the data frequency.

Cumulatively, these blanking intervals occupy a significant portion of the disk, whereby servo or user data cannot be stored, thereby reducing the overall storage capacity of the disk.

Thus, a hitherto unsolved need has remained for a method of formatting information on a rotating storage disk that eliminates blanking intervals formed thereon for increasing the information storage capacity of the disk.

SUMMARY OF THE INVENTION

An object of the present invention is to format a rotating magnetic storage disk to eliminate blanking intervals formed thereon, thus increasing the information storage capacity of the storage disk.

The present invention provides a disk drive control method which reduces the space on the data storage surface of a storage disk otherwise effectively required to be taken up by embedded servo sectors. In disk drives employing wide-writer, narrow-reader, dual element heads, each servo burst field ends with a burst correction value (BCV) field. This BCV field enables the wide-writer head to be accurately positioned within track boundaries before writing begins to the data sector following a servo sector. The present invention takes advantage of the fact that burst correction values are only required by the head incident to data writing operations. Since a finite settle time (shown as the blanking interval, $t_{blank}$, in FIG. 1(C)) is required to switch the read channel from servo mode to user data read mode, and since the BCV field is not needed for reading operations, mode switching and channel settling prior to data reading can begin while the head is still passing over the BCV field. Sooner switch over from servo mode to user data read mode means that the blanking interval, and concomitant disk space, heretobefore required by the prior art approach, is completely avoided by the new disk drive control method.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 1(A) shows a highly diagrammatic plan view of a rotating magnetic data storage disk and voice coil head positioner of a disk drive incorporating principles of the prior art, showing a multiplicity of radial servo sectors embedded between data sectors.

FIG. 1(B) is an expanded and linearized representation of one of the servo sectors and a portion of an adjacent data sector of the FIG.(1A) disk pattern.

FIG. 1(C) is a series of control waveform graphs arranged along a common time base illustrating conventional read/write/servo control of the FIG. 1(A) disk drive.

FIG. 2(A) illustrates a read/write head positioned with a data track for writing user-data thereon.

FIG. 2(B) illustrates a read/write head positioned with a data track for reading user-data therefrom.

FIG. 4(A) is a very similar view of the FIG. 1(A) view illustrating elimination of the blanking interval in accordance with the disk drive control method of the present invention.

FIG. 4(B) is an expanded and linearized representation of one of the servo sectors and a portion of an adjacent data sector of the FIG. 4(A) disk pattern.

FIG. 4(C) is a series of control waveform graphs arranged along a common time base illustrating conventional read/write/servo functions of the disk drive in accordance with principles of the present invention.

DETAILED DESCRIPTION OF A PREFERRED EMBODIMENT

Figure 3:
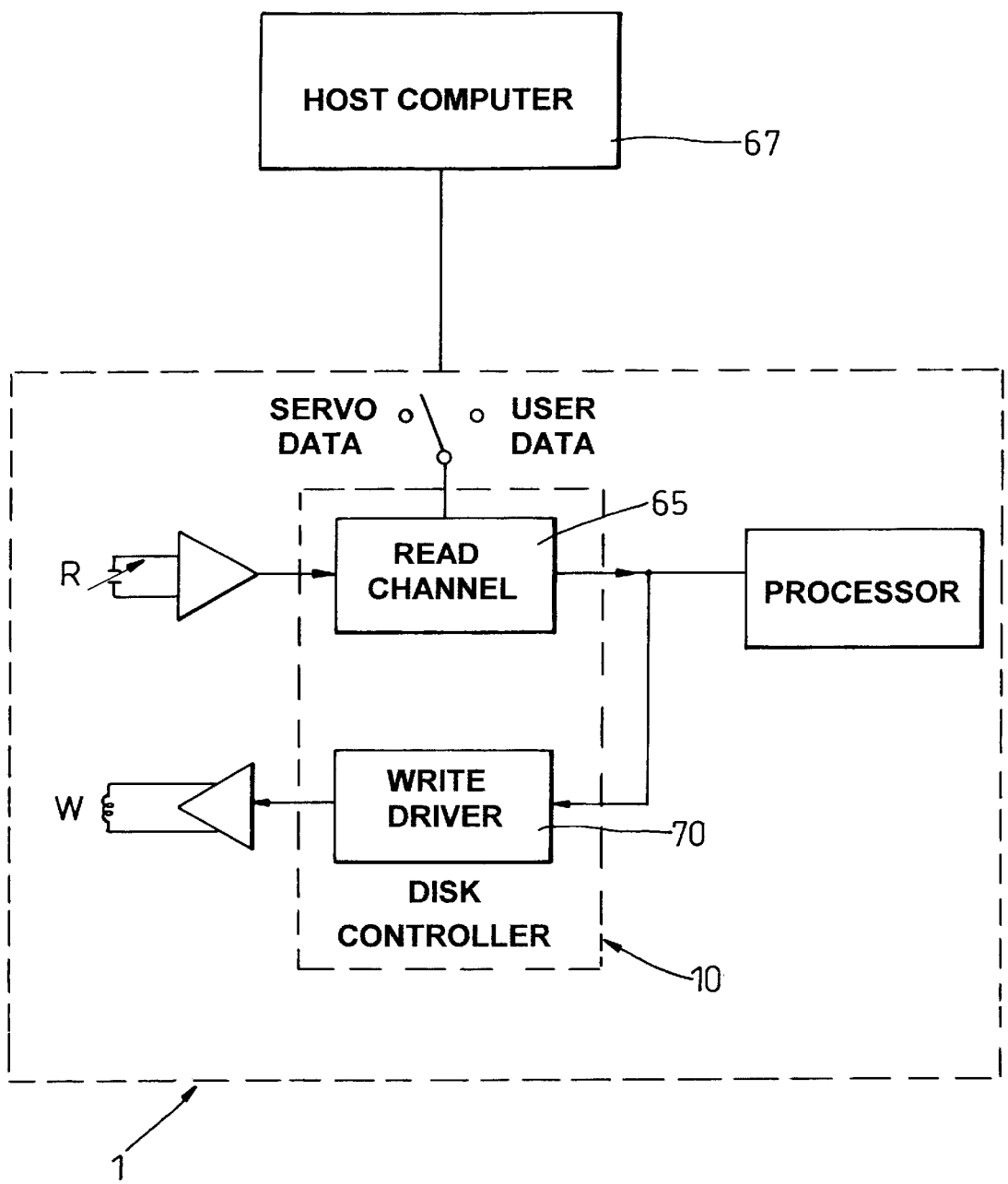
FIG. 3 is a simplified high level block diagram of a host computer attached to a partial view of a disk drive, the disk drive is further subdivided into a high level block diagram illustrating a disk drive controller coupled with a processor and read/write head circuit, all of which provides disk drive write/read control in accordance with principles of the present invention.

Referring to FIGS. 3 and 4(A), the present invention is a method of controlling a disk drive 1 to increase the storage capacity of the drive 1 by eliminating blanking intervals otherwise required by embedded servo sectors 75 defined on the storage surface of the disk 5.

Figure 5:
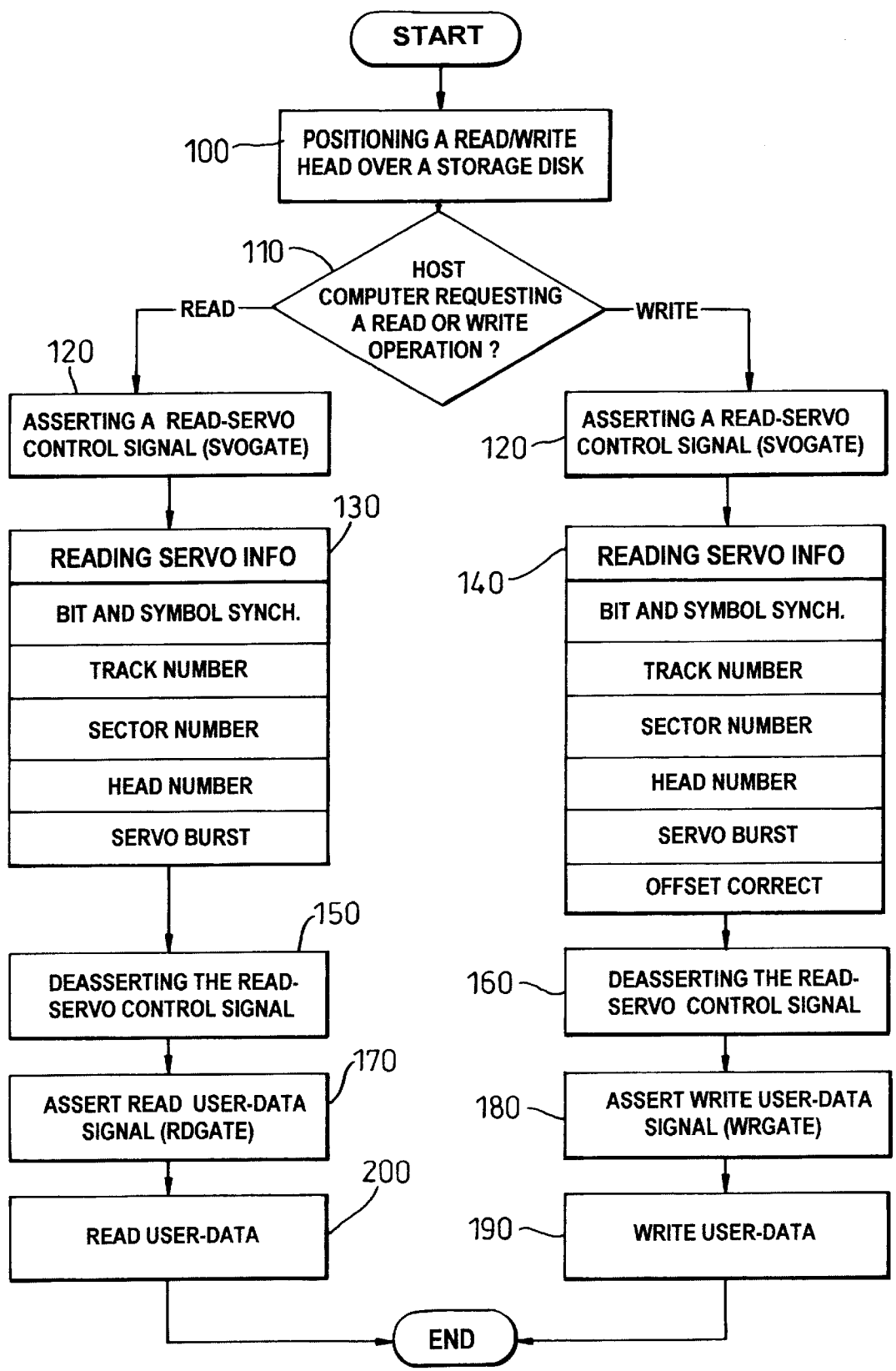
FIG. 5 is a flowchart illustrating steps for carrying out principles of the present invention.

Referring further to FIGS. 4(B)–(C) and 5, in accordance with principles of the present invention, the method includes the steps of positioning a magnetic read/write head 45 over and in a transducing relationship with the rotating storage disk 5 at step 100. At this instant, at step 110, a command from a host computer 67 (FIG.3), which is attached to the drive, is decoded to determine if the host is requesting a read operation or a write operation. If the host computer 67 is requesting a read operation or the host 67 is in a read user-data mode, a disk controller 10 associated with the drive will assert a read servo (SVOGATE) control signal at step 120 for reading a first predetermined set of servo data at step 130 prior to reading the user-data. The SVOGATE control is signal is thereafter deasserted at step 150, however this deassertion at step 150 occurs before the head completely passes by the burst correction value field 40 as shown in FIG. 4(C). In deasserting the SVOGATE control signal at step 150 while the head 45 is still positioned over the preceding servo sector 75, the read channel 65 (FIG. 3) is provided with additional time, (t), to adapt from reading at the servo frequency to reading at the user-data frequency. It is important to note that this additional settle time (t) occurs while the read/write head 45 is physically positioned within the servo sector 75 of the storage disk 5.

Since the read channel 65 is adapted for reading at the user data frequency while the read/write head is still positioned within the servo sector 75, the read channel 65 can commence reading user-data immediately upon entering the data sector 81 of the storage disk 5. Accordingly, the disk controller 10 asserts a read user-data control signal (RDGATE) at step 170 in FIG. 5 and as graphically illustrated in FIG. 4(C), coincident with the head 45 passing over a data sector 81 immediately following the servo sector 75. As a result of having the capacity to read user data immediately following a servo sector, user-data can be initially written in the data sector immediately adjacent to the servo sectors 75 as graphically illustrated by the control signals in FIG. 4(C).

If, however, the host computer 67 is requesting a write operation or the host 67 is in a write user-data mode, the disk controller 10 will assert a SVOGATE signal at step 120 for reading a second predetermined set of servo data at step 140 prior to writing user-data. However, the SVOGATE control signal, in this instance, is deasserted at step 160 after the head completely passes by the burst correction value field 40. Thus, the SVOGATE control signal is deasserted after reading the servo sector in its entirety as illustrated in FIG. 4(C). After deassertion of the SVOGATE control signal at step 160, the disk controller 10 asserts a write user-data (WRGATE) control signal at step 180, coincident with the head passing over the beginning of the data sector immediately following the servo sector for writing user-data to the data sector of the disk. In asserting the WRGATE control signal at the instant the head passes over the data sector at step 180, user data may be written immediately adjacent to the servo sector such that a blanking interval is avoided. This elimination of blanking intervals, otherwise required by disk drive control methods of the prior art, provides additional space in the data sector for writing user data. Therefore, eliminating the blanking intervals defined in the storage disk contributes to increasing the information storage capacity of the disk 5.

A blanking interval is not required by the read channel when adapting from reading at the servo frequency to writing at the data frequency because the write driver 70 is comprised of a data path that is independent of the read channel 65 as shown in FIG. 2. Thus the adaptation time incurred when the disk controller 10 switches from reading at the servo data frequency to writing at the data frequency has no affect on the operation of the write driver 70. Accordingly, the write driver 70 can commence writing operations immediately after the read/write head 45 leaves the servo sector 75.

Referring to FIG. 4(B), the first predetermined set of servo-data prerecorded onto the storage disk 5 comprises, data bit and data symbol synchronization field 15; data track number field 20; data sector number field 25, and head number field 30. The first predetermined set of servo data further includes high frequency servo burst 35 information for adaptively positioning the read/write head 45 on a data track 50. A field of burst correction values 40 is included at the end of the servo sector 75 for fine positioning the read/write head 45 with respect to a data track 50 (see FIG. 2(A) and 2(B)). However these burst correction values 40 are not required when the disk controller 10 is in the read mode as determined at step 110 because the high frequency servo bursts 35 are sufficient to position the read/write head 45 on the data track 50. Thus, the burst correction values 40, even though prerecorded in each one of a plurality of servo sectors, are only read when the disk controller is in a write data mode as determined in step 110.

The second predetermined set of servo data prerecorded onto the storage disk, which is read when the disk controller is in write user-data mode as determined at step 110, comprises the same servo data and sequence as that of the first predetermined set of servo data. Additionally, the second predetermined set of servo data comprises reading the burst correction values field 40 after the servo bursts 35 but prior to writing user data. The burst correction values field 40, as previously described, provide fine positioning for the read/write head 45 with respect to the data track 50.

The above described method of formatting information on a rotating storage disk which eliminates blanking intervals has a significant advantage over the prior in that the storage capacity of the storage disk is increased.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of controlling a disk drive, the disk drive including a disk controller; the disk drive further including a storage disk having data sectors and embedded servo sectors, the data sectors being written at a user-data frequency related to track radius and the servo sectors being written at a constant servo data frequency across a radial storage extent of the disk surface; each servo sector includes at its end a burst correction value field; the drive using a read/write head having a wider-writer and a narrower-reader to write/read data to or from the disk; the drive further having a read channel which requires a finite adaptation time for adapting between the constant servo data frequency and the user-data frequency; the burst correction value fields being only used for head position correction during set up for data writing operations, the method comprising the steps of:

(A) positioning a magnetic read/write head over and in a transducing relationship with the rotating storage disk;

(B) decoding a command from a host attached to the disk drive to determine whether a read operation or a write operation is requested;

(C) if a read operation is requested by the host,
(i) asserting a read-servo control signal for reading servo sector data;
(ii) deasserting the read-servo control signal before the head completely passes by the burst correction value field of a preceding servo sector,
wherein deasserting the read-servo control signal before the head completely passes by the burst correction value field provides the read channel additional adaptation time for adapting between the constant servo data frequency and the user-data frequency;
(D) if a write operation is requested by the host,
(i) asserting a read-servo control signal for reading servo sector data; and
(ii) deasserting the read-servo control signal after the head completely passes by the burst correction value field.

2. The method of controlling a disk drive of claim 1, wherein if a read operation is requested the method further comprises a step of asserting a read user-data control signal coincident with the head passing over the data sector immediately following the servo sector, for reading user-data therefrom.

3. The method of controlling a disk drive of claim 1, wherein if a write operation is requested the method further comprises a step of asserting a write gate control signal coincident with the head passing over the beginning of the data sector immediately following the servo sector, such that a blanking interval otherwise required during a read operation is avoided.

4. The method of controlling a disk drive of claim 1, wherein the servo sectors include a number of high frequency servo bursts, the servo bursts being recorded at controlled radial offsets from data track center.

5. The method of controlling a disk drive of claim 1, wherein the burst correction values include information for fine positioning a read/write head on the center of a data track.

6. A method of controlling a disk drive coupled with a host computer, the disk drive including a disk controller; the disk drive further including a storage disk having data sectors and embedded servo sectors, the data sectors being written at a user-data frequency related to track radius and the servo sectors being written at a constant servo data frequency across a radial storage extent of the disk surface; each servo sector includes at its end a burst correction value field; the drive using a read/write head having a wider-writer and a narrower-reader to write/read data to or from the disk; the drive further having a read channel which requires a finite adaptation time for adapting between the constant servo data frequency and the user-data frequency; the burst correction value fields are only used for head position correction during set up for data writing operations, the method comprising the steps of:

(A) positioning a magnetic read/write head over and in a transducing relationship with the rotating storage disk;
(B) decoding a command from the host computer to determine whether a read operation or a write operation is requested;
(C) if a read operation is requested by the host,
(i) asserting a read-servo control signal for reading servo sector data, the servo sector data including the burst correction value field;
(ii) deasserting the read-servo control signal before the head completely passes by the burst correction value field of a preceding servo sector,
wherein deasserting the read-servo control signal before the head completely passes by the burst correction value field provides the read channel additional adaptation time for adapting between the constant servo data frequency and the user-data frequency;
(D) if a write operation is requested by the host,
(i) asserting a read-servo control signal for reading servo sector data; and
(ii) deasserting the read-servo control signal after the head completely passes by the burst correction value field.

7. The method of controlling a disk drive of claim 6, wherein if a read operation is requested the method further comprises a step of asserting a read user-data control signal coincident with the head passing over the data sector immediately following the servo sector, for reading user-data therefrom.

8. The method of controlling a disk drive of claim 6, wherein if a write operation is requested the method further comprises a step of asserting a write gate control signal coincident with the head passing over the beginning of the data sector immediately following the servo sector, such that a blanking interval otherwise required during a read operation is avoided.

9. The method of controlling a disk drive of claim 6, wherein the servo sectors include a number of high frequency servo bursts, the servo bursts being recorded at controlled radial offsets from data track center.

10. The method of controlling a disk drive of claim 6, wherein the servo sector data further includes: a data bit and data symbol synchronization field, a data track number field, a data sector number field, a head number field, and high frequency servo burst information for adaptively positioning the read/write head on a data track.

11. The method of controlling a disk drive of claim 6, wherein the burst correction values include information for fine positioning a read/write head on the center of a data track.

* * * * *